US012693785B2

(12) United States Patent
Shiraishi

(10) Patent No.: US 12,693,785 B2
(45) Date of Patent: Jul. 28, 2026

(54) MEMORY CONTROLLER, CONTROL METHOD FOR MEMORY CONTROLLER, AND STORAGE MEDIUM

(71) Applicant: CANON KABUSHIKI KAISHA, Tokyo (JP)

(72) Inventor: Daisuke Shiraishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/626,397

(22) Filed: Apr. 4, 2024

(65) Prior Publication Data

US 2024/0370173 A1    Nov. 7, 2024

(30) Foreign Application Priority Data

May 1, 2023    (JP) ................................. 2023-075815

(51) Int. Cl.
*G06F 3/06* (2006.01)
(52) U.S. Cl.
CPC .......... *G06F 3/0613* (2013.01); *G06F 3/0659* (2013.01); *G06F 3/0673* (2013.01)
(58) Field of Classification Search
CPC ..... G06F 3/0613; G06F 3/0659; G06F 3/0673
See application file for complete search history.

(56) References Cited

U.S. PATENT DOCUMENTS

| | | | |
|---|---|---|---|
| 11,842,079 B2 | 12/2023 | Ito et al. | |
| 2009/0097346 A1* | 4/2009 | Rao ..................... | G11C 11/4096 365/203 |
| 2013/0145373 A1* | 6/2013 | Noro ..................... | G06F 9/3889 718/102 |
| 2015/0293709 A1* | 10/2015 | Quach ................. | G06F 13/1626 711/105 |
| 2020/0057579 A1* | 2/2020 | Mathews .............. | G06F 3/0673 |
| 2021/0064296 A1* | 3/2021 | Ito ......................... | G06F 3/0659 |

FOREIGN PATENT DOCUMENTS

JP        3235578 B2    12/2001

OTHER PUBLICATIONS

A dictionary definition of the term 'arbitrary' (Year: 2023).*

* cited by examiner

*Primary Examiner* — Janice M. Girouard
(74) *Attorney, Agent, or Firm* — Venable LLP

(57) ABSTRACT

A memory controller that issues a command to access a plurality of memories sharing a data signal, the memory controller comprising: a holding circuit configured to hold a read and/or write access request; and a control circuit configured to select an arbitrary access request from the access requests held in the holding circuit and to issue a read command and/or a write command, wherein the control circuit controls not to select, for a predetermined period from issuance of a read command and/or a write command immediately preceding, an access request to a memory other than a memory to which the read command and/or the write command was issued immediately preceding, from among the access requests held in the holding circuit.

14 Claims, 8 Drawing Sheets

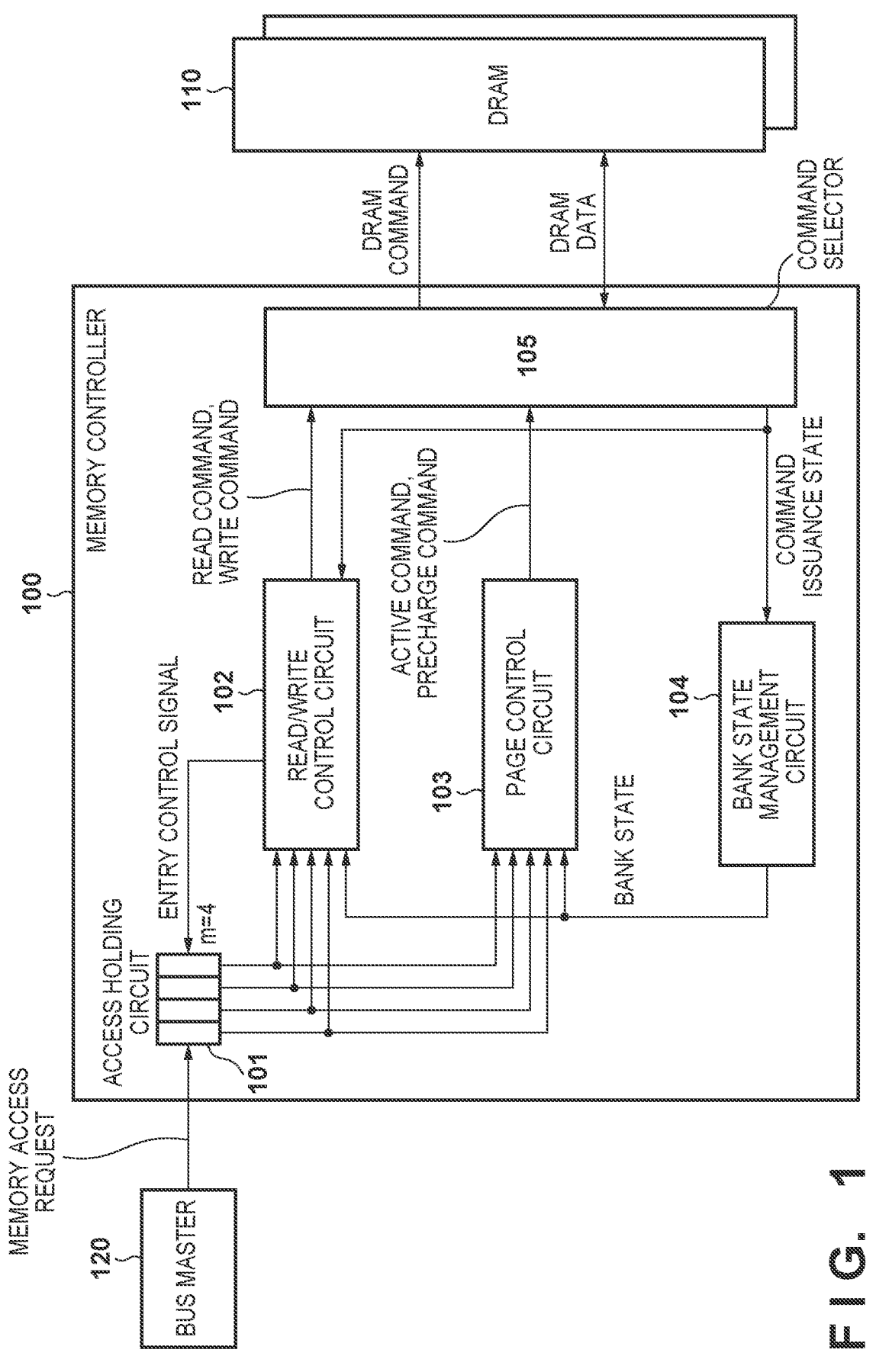
F I G. 1

F I G. 2

1011

| ACCESS TYPE | TARGET MEMORY | TARGET BANK | TARGET PAGE | TARGET COLUMN | NUMBER OF REMAINING READ/WRITE COMMANDS |

ACCESS HOLDING CIRCUIT AT TIME POINT T1

| | ACCESS TYPE | TARGET MEMORY | TARGET BANK | TARGET PAGE | TARGET COLUMN | NUMBER OF REMAINING READ/WRITE COMMANDS |
|---|---|---|---|---|---|---|
| MEMORY ACCESS REQUEST 1 | READ | 1 | Don't care | Don't care | Don't care | 1 |
| MEMORY ACCESS REQUEST 0 | READ | 0 | Don't care | Don't care | Don't care | 2 |

RECEIVING ORDER: OLD →

ACCESS HOLDING CIRCUIT AT TIME POINT T3

| | ACCESS TYPE | TARGET MEMORY | TARGET BANK | TARGET PAGE | TARGET COLUMN | NUMBER OF REMAINING READ/WRITE COMMANDS |
|---|---|---|---|---|---|---|
| MEMORY ACCESS REQUEST 1 | READ | 1 | Don't care | Don't care | Don't care | 1 |
| MEMORY ACCESS REQUEST 0 | READ | 0 | Don't care | Don't care | Don't care | 1 |

F I G.   4B

ACCESS HOLDING CIRCUIT AT TIME POINT T4

| | ACCESS TYPE | TARGET MEMORY | TARGET BANK | TARGET PAGE | TARGET COLUMN | NUMBER OF REMAINING READ/WRITE COMMANDS |
|---|---|---|---|---|---|---|
| | | | | | | |
| | | | | | | |
| | | | | | | |
| MEMORY ACCESS REQUEST 1 | READ | 1 | Don't care | Don't care | Don't care | 1 |

ACCESS HOLDING CIRCUIT AT TIME POINT T6

| | ACCESS TYPE | TARGET MEMORY | TARGET BANK | TARGET PAGE | TARGET COLUMN | NUMBER OF REMAINING READ/WRITE COMMANDS |
|---|---|---|---|---|---|---|
| | | | | | | |
| | | | | | | |
| MEMORY ACCESS REQUEST 2 | READ | 0 | Don't care | Don't care | Don't care | 2 |
| MEMORY ACCESS REQUEST 1 | READ | 1 | Don't care | Don't care | Don't care | 1 |

F I G. 4C

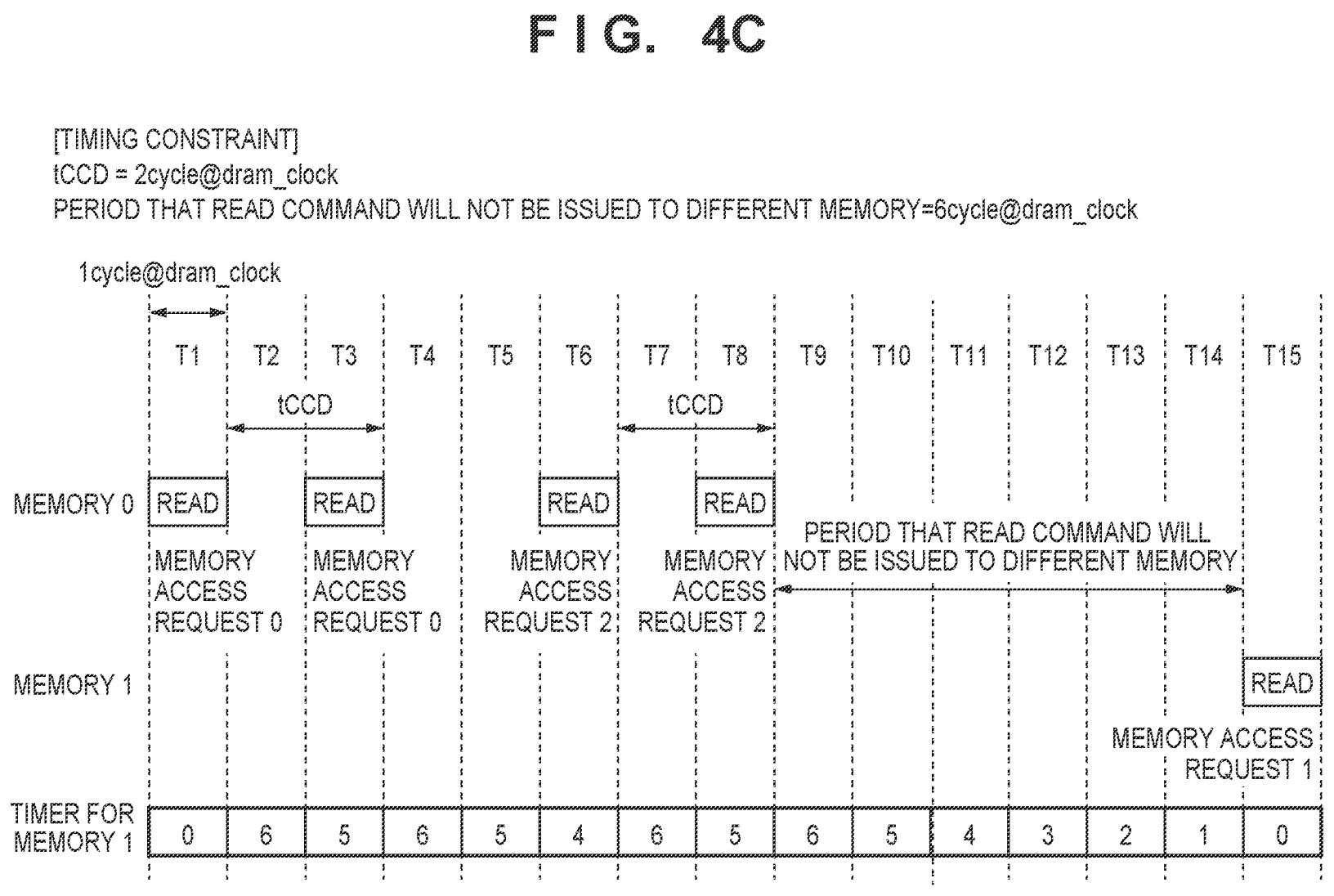

[TIMING CONSTRAINT]
tCCD = 2cycle@dram_clock
PERIOD THAT READ COMMAND WILL NOT BE ISSUED TO DIFFERENT MEMORY=6cycle@dram_clock

| | T1 | T2 | T3 | T4 | T5 | T6 | T7 | T8 | T9 | T10 | T11 | T12 | T13 | T14 | T15 |
|---|---|---|---|---|---|---|---|---|---|---|---|---|---|---|---|
| MEMORY 0 | READ | MEMORY ACCESS REQUEST 0 | READ | MEMORY ACCESS REQUEST 0 | | READ | MEMORY ACCESS REQUEST 2 | READ | MEMORY ACCESS REQUEST 2 | | | | | | READ |
| | | | tCCD | | | | | tCCD | | PERIOD THAT READ COMMAND WILL NOT BE ISSUED TO DIFFERENT MEMORY | | | | MEMORY ACCESS REQUEST 1 |
| MEMORY 1 | | | | | | | | | | | | | | | |
| TIMER FOR MEMORY 1 | 0 | 6 | 5 | 6 | 5 | 4 | 6 | 5 | 6 | 5 | 4 | 3 | 2 | 1 | 0 |

1cycle@dram_clock

F I G. 5A

ACCESS HOLDING CIRCUIT AT TIME POINT T1

| | ACCESS TYPE | TARGET MEMORY | TARGET BANK | TARGET PAGE | TARGET COLUMN | NUMBER OF REMAINING READ/WRITE COMMANDS |
|---|---|---|---|---|---|---|
| MEMORY ACCESS REQUEST 1 | READ | 1 | Don't care | Don't care | Don't care | 1 |
| MEMORY ACCESS REQUEST 0 | READ | 0 | Don't care | Don't care | Don't care | 2 |

RECEIVING ORDER: OLD →

ACCESS HOLDING CIRCUIT AT TIME POINT T3

| | ACCESS TYPE | TARGET MEMORY | TARGET BANK | TARGET PAGE | TARGET COLUMN | NUMBER OF REMAINING READ/WRITE COMMANDS |
|---|---|---|---|---|---|---|
| MEMORY ACCESS REQUEST 1 | READ | 1 | Don't care | Don't care | Don't care | 1 |
| MEMORY ACCESS REQUEST 0 | READ | 0 | Don't care | Don't care | Don't care | 1 |

ACCESS HOLDING CIRCUIT AT TIME POINT T4

| | ACCESS TYPE | TARGET MEMORY | TARGET BANK | TARGET PAGE | TARGET COLUMN | NUMBER OF REMAINING READ/WRITE COMMANDS |
|---|---|---|---|---|---|---|
| MEMORY ACCESS REQUEST 1 | READ | 1 | Don't care | Don't care | Don't care | 1 |

FIG. 5B

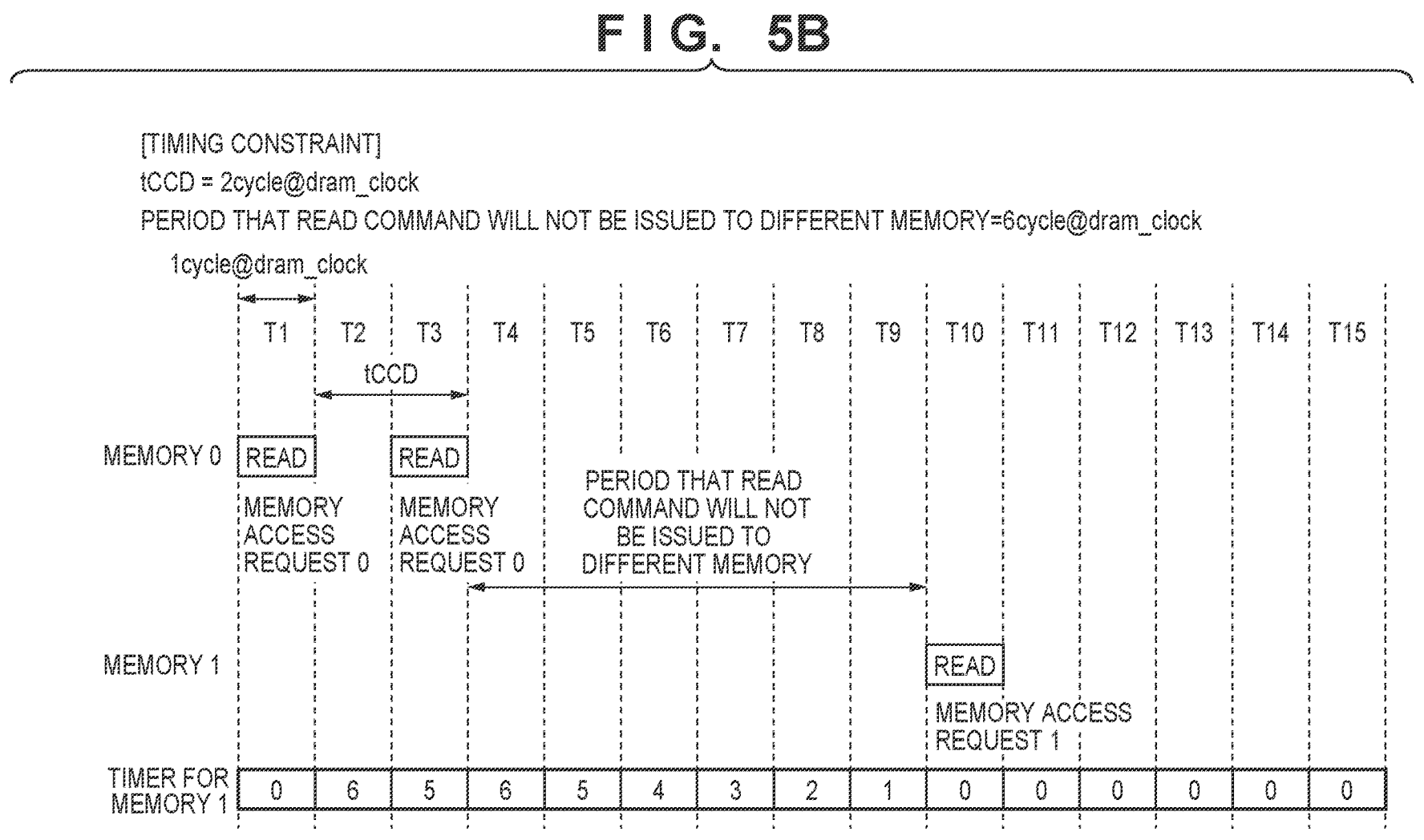

[TIMING CONSTRAINT]

tCCD = 2cycle@dram_clock

PERIOD THAT READ COMMAND WILL NOT BE ISSUED TO DIFFERENT MEMORY=6cycle@dram_clock

MEMORY CONTROLLER, CONTROL METHOD FOR MEMORY CONTROLLER, AND STORAGE MEDIUM

BACKGROUND OF THE INVENTION

Field of the Invention

The present invention relates to a memory controller, a control method for the memory controller, and a storage medium, and particularly relates to technology connected to a dynamic random access memory (DRAM) and configured to select an arbitrary memory access request from a plurality of memory access requests and to issue a command.

Description of the Related Art

A dynamic random access memory (DRAM) is generally used as a main storage apparatus in a computer system. With higher functionality and higher performance of the computer system, performance requirements for the DRAM have increased, and various techniques of a memory controller have been proposed to exert performance of the DRAM to the maximum.

With respect to a plurality of memories sharing data, when a memory controller switches memories to which the memory controller issues a read/write command, an interval between the read/write commands issued to different memories needs to satisfy timing constraints defined so as not to cause shared signals to collide with each other. And thus, a gap occurs in a data bus, and this causes a decrease in memory utilization efficiency.

Japanese Patent No. 3235578 discloses that the decrease in the memory utilization efficiency is suppressed by a memory controller arbitrating a plurality of memory access requests to reduce the number of times of memory switching.

However, in Japanese Patent No. 3235578, there is no description about a behavior when memory access request is stopped to a memory to which the read/write command is issued immediately preceding. When the memory access request to a memory different from a memory immediately preceding is selected, it is necessary to wait issuance of the read/write command of the selected memory access request, from the read/write command issued immediately preceding, until a period during which the read/write command cannot be issued to a different memory elapses. During this period, even when the memory controller receives a memory access request to the memory to which the read/write command has been issued immediately preceding, the memory switching occurs by the read/write command of the memory access request already being selected, and then the memory utilization efficiency deteriorates.

SUMMARY OF THE INVENTION

The present invention has been made in view of the above-described problem, and provides technology of suppressing a decrease in memory utilization efficiency.

According to one aspect of the present invention, there is provided a memory controller that issues a command to access a plurality of memories sharing a data signal, the memory controller comprising: a holding circuit configured to hold a read and/or write access request; and a control circuit configured to select an arbitrary access request from the access requests held in the holding circuit and to issue a read command and/or a write command, wherein the control circuit controls not to select, for a predetermined period from issuance of a read command and/or a write command immediately preceding, an access request to a memory other than a memory to which the read command and/or the write command was issued immediately preceding, from among the access requests held in the holding circuit.

Further features of the present invention will become apparent from the following description of exemplary embodiments (with reference to the attached drawings).

BRIEF DESCRIPTION OF THE DRAWINGS

FIG. 1 is a configuration diagram of a memory controller in an embodiment of the present invention.

FIG. 2 is a configuration diagram of an access holding circuit entry in the embodiment of the present invention.

FIG. 3 is a configuration diagram of a read/write control circuit in the embodiment of the present invention.

FIGS. 4A to 4C are a diagram illustrating an operation example 1 for selecting a memory access request in the embodiment of the present invention.

FIGS. 5A and 5B are a diagram illustrating an operation example 2 for selecting the memory access request in the embodiment of the present invention.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a configuration diagram of a memory controller 100 in a present embodiment. The memory controller 100 is connected to a DRAM 110 including a plurality of banks and to a bus master 120. The DRAM 110 is constituted by two memory devices (a memory 0 and a memory 1), and the memory 0 and the memory 1 are configured to share a data signal. Although the data signal is shared by the two DRAMs in the present embodiment, the number of DRAMs sharing the data signal is not limited to two and may be three or more. The bus master 120 transmits, to the memory controller 100, a memory access request including address information and write data. The memory controller 100 generates a DRAM command based on the memory access request received from the bus master 120, and transmits the generated DRAM command to one of a plurality of the DRAMs 110. Further, the memory controller 100 transfers data to/from the DRAM 110 based on the transmitted DRAM command.

The memory controller 100 includes an access holding circuit 101, a read/write control circuit 102, a page control circuit 103, a bank-state management circuit 104, and a command selector 105.

Figure 2:
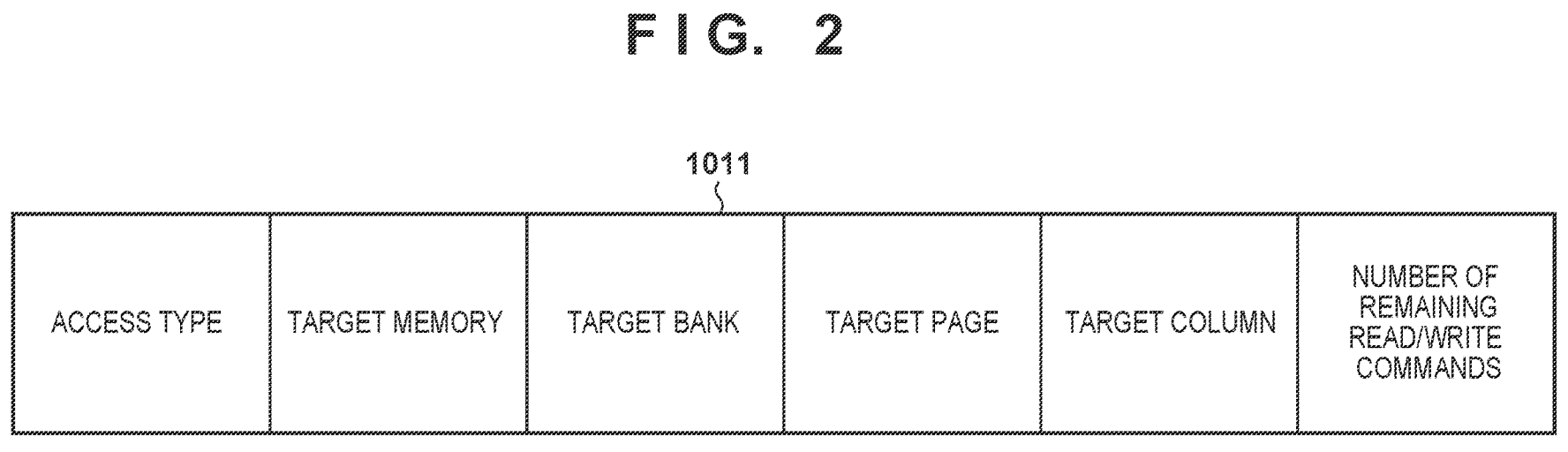

First, the access holding circuit 101 will be described. The access holding circuit 101 is a buffer configured to hold a plurality of memory access requests. The access holding circuit 101 is constituted by m (m≥2) entries. Here, m may be an arbitrary number. Further, FIG. 2 is a configuration diagram of an access holding circuit entry 1011 in the present embodiment. In the present embodiment, the access holding circuit 101 includes m of the access holding circuit entries 1011 illustrated in FIG. 2. As illustrated in FIG. 2, the access holding circuit entry 1011 includes fields for an access type, a target memory, a target bank, a target page, a target column, and the number of remaining read/write commands, respectively. The access holding circuit 101 converts the memory access request received from the bus master 120 such that the memory access request corresponds to each of the fields, and holds the converted memory access request. Information stored in each of the fields is as follows.

(a) Access Type Field

The access type field indicates an access type of the memory access request stored in the entry WRITE: the memory access request is "write" (data writing)

READ: the memory access request is "read" (data reading)

(b) Target Memory Field

The target memory field indicates a target memory accessed by the memory access request stored in the entry (c) Target Bank Field The target bank field is a bank address accessed by the memory access request stored in the entry (d) Target Page Field The target page field is a page address accessed by the memory access request stored in the entry (e) Target Column Field The target column field is a first column address accessed by the memory access request stored in the entry (f) Remaining Read/Write Command Number Field The remaining read/write command number field is the number of remaining DRAM read/write commands executed by the memory access request stored in the entry When the access holding circuit 101 stores a memory access request, the access holding circuit 101 stores the memory access request in the entry following a tail end of the stored memory access request. When the memory access request is read from the access holding circuit 101, the memory access request can be read from any entry.

Subsequently, an entry control signal input to the access holding circuit 101 will be described. The entry control signal includes an entry number field, a deletion field, and an update field. When 1 is set in the deletion field, the access holding circuit 101 deletes the entry indicated by the entry number field. When 1 is set in the update field, the access holding circuit 101 updates the column field of the entry indicated by the entry number field, to the first column address accessed by the next DRAM command. Further, the access holding circuit 101 updates the remaining read/write command number field to a value obtained by subtracting 1.

Next, the read/write control circuit 102 will be described. The read/write control circuit 102 can refer all of the memory access requests stored in the access holding circuit 101. Among the memory access requests stored in the access holding circuit 101, the read/write control circuit 102 selects an arbitrary memory access request from the memory access requests for which a page to be accessed is open, and for which waiting for command issuance due to memory switching will not occur. Whether or not the page to be accessed by the memory access request is open is determined from the target memory field, the target bank field, and the target page field of the access holding circuit entry 1011, and from a bank state generated by the bank-state management circuit 104. Then, the read/write control circuit 102 generates a read command or a write command from the selected memory access request, and outputs the read command or the write command to the command selector 105. The read/write control circuit 102 of the present embodiment has a function of selecting the memory access request to sequentially issue the read command and the write command in order to suppress a read/write switching penalty.

Subsequently, a procedure in which the read/write control circuit 102 generates the entry control signal will be described. When the last read command or the last write command executed by the memory access request is issued, the processing of the corresponding memory access request is completed. Therefore, the read/write control circuit 102 generates the entry control signal to delete the corresponding entry from the access holding circuit 101. On the other hand, when a read command or a write command that is not last is issued, the read/write control circuit 102 generates the entry control signal to update the corresponding entry of the access holding circuit 101. However, when the last read command or the last write command is issued, it is not necessary to update the corresponding entry. Whether or not the issued read command or write command is the last one is determined by checking whether or not the remaining read/write command number field of the access holding circuit entry 1011 is 1.

Next, the page control circuit 103 will be described. The page control circuit 103 can refer all of the memory access requests stored in the access holding circuit 101. Inputs to the page control circuit 103 include the memory access request stored in the access holding circuit 101, and the bank state output by the bank-state management circuit 104. The page control circuit 103 generates a page control command such as an active command or a precharge command, based on the memory access request stored in the access holding circuit 101 and the bank state output by the bank-state management circuit 104. Then, the generated page control command is output to the command selector 105.

Next, the bank-state management circuit 104 will be described. The bank-state management circuit 104 updates the bank state based on a command issuance state input from the command selector 105. The command issuance state includes a command classification issued to the DRAM 110, and information of the memory, the bank, and the page to which the command is issued. The bank state includes, for each of the banks constituting the DRAM 110, whether or not the page is open and the page address that is open.

Finally, the command selector 105 will be described. The command selector 105 selects one of the read/write command input from the read/write control circuit 102 and the page control command input from the page control circuit 103, and issues the command to the DRAM 110. Although not described in the present embodiment, a refresh command or the like may also be selected together. Further, the command selector 105 outputs, to the read/write control circuit 102 and the bank-state management circuit 104, the command classification of the command issued to the DRAM 110 and the command issuance state constituted by the memory, the bank, and the page to which the command is issued.

Figure 3:
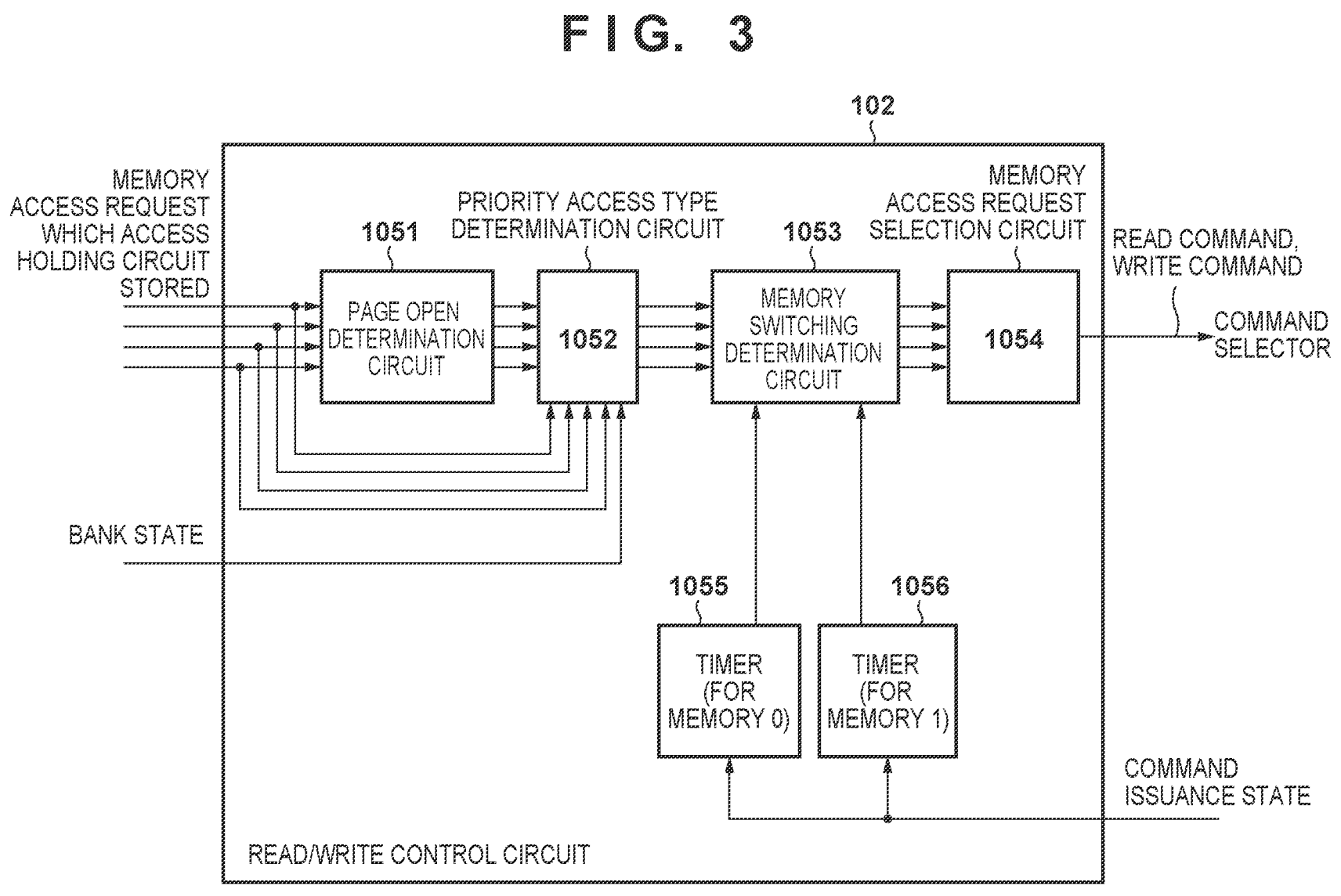

FIG. 3 is a configuration diagram of the read/write control circuit 102 in the present embodiment. The read/write control circuit 102 includes a page open determination circuit 1051, a priority access type determination circuit 1052, a memory switching determination circuit 1053, a memory access request selection circuit 1054, a timer 1055, and a timer 1056. The timer 1055 is a timer corresponding to the memory 0 of the plurality of DRAMs 110, and the timer 1056 is a timer corresponding to the memory 1 thereof.

The page open determination circuit 1051 determines, based on the bank state, whether or not the target bank of the target memory has opened the target page for each of the memory access requests stored in the access holding circuit 101. The page open determination circuit 1051 outputs, to the priority access type determination circuit 1052, only the memory access request for which the target page is being opened, among the memory access requests stored in the access holding circuit 101, and masks the other memory access requests.

The priority access type determination circuit 1052 determines whether or not the access type corresponds to a priority access type, for each of the memory access requests output by the page open determination circuit 1051. The priority access type is generated by the priority access type determination circuit 1052 based on the memory access request stored in the access holding circuit 101 and the bank state, and indicates whether it is a period for preferentially issuing the read command or a period for preferentially issuing the write command. The priority access type determination circuit 1052 outputs, to the memory switching determination circuit 1053, only the memory access request corresponding to the priority access type among the memory access requests output by the page open determination circuit 1051, and masks the other memory access requests.

When the command issuance state output from the command selector 105 indicates the read command issuance to a memory other than the memory 0, the timer 1055 sets a period after issuance of the read command to a certain memory, during which the read command cannot be issued to a different memory. Further, when the command issuance state output from the command selector 105 indicates the write command issuance to a memory other than the memory 0, the timer 1055 sets a period after issuance of the write command to a certain memory, during which the write command cannot be issued to a different memory. At times other than the setting time, the value of the timer 1055 is decremented as the time elapses, and the decrementing stops at 0. In the present embodiment, the period after issuance of the read command or the write command to a certain memory, during which the read command or the write command cannot be issued to a different memory is set in the timer, but the present invention is not limited thereto. The period after issuance of the read/write command to a certain memory, during which the read/write command cannot be issued to a different memory may be increased or decreased, and by doing so, a relationship between the occurrence frequency of the memory switching and the waiting time for the memory access request can be adjusted.

The timer 1056 sets a timer when the command issuance state output from the command selector 105 is the read command or the write command to a memory other than the memory 1, and in other cases, decrements as the time elapses. Other behaviors of the timer 1056 are the same as those of the timer 1055.

The memory switching determination circuit 1053 determines whether or not waiting for timing constraints for the memory switching is necessary, for each of the memory access requests output by the priority access type determination circuit 1052. Whether or not waiting for the timing constraints for the memory switching is necessary for the memory access request can be determined by whether or not the value of the timer corresponding to the target memory of the memory access request is other than 0. When the target memory of the memory access request is the memory 0, the timer 1055 for the memory 0 is referred. Further, when the target memory of the memory access request is the memory 1, the value of the timer 1056 for the memory 1 is referred. The memory switching determination circuit 1053 outputs, to the memory access request selection circuit 1054, only the memory access request that does not cause waiting for command issuance due to the memory switching to occur, among the memory access requests output by the priority access type determination circuit 1052. Then, the memory switching determination circuit 1053 masks the memory access request for which waiting for command issuance occurs.

The memory access request selection circuit 1054 selects an arbitrary memory access request from the memory access requests output by the memory switching determination circuit 1053. Then, the memory access request selection circuit 1054 generates the read command or the write command of the selected memory access request, and outputs the read command or the write command to the command selector 105.

<Operation>

FIGS. 4A to 4C and FIGS. 5A and 5B are diagrams each illustrating an operation example of a memory access request selection in the present embodiment. In these operation examples, it is assumed that the priority access type is READ, and the target bank of the target memory has opened the target page in response to the memory access request held in the access holding circuit 101. The timing constraints and the state of the memory access request held in the access holding circuit 101 are illustrated in the drawings. For example, with regard to the timing constraints, tCCD=2 cycles, and the period during which the read command cannot be issued to a different memory=6 cycles. Further, for the sake of explanation, memory access requests 0 to 2 are assigned, as an identifier, to each of the memory access requests held in the access holding circuit 101.

FIGS. 4A to 4C are a diagram illustrating an operation example 1 of the memory access request selection in the present embodiment. At a time point T1, the access holding circuit 101 holds a memory access request 0 (access type: READ, target memory: 0, number of remaining read/write commands: 2) and a memory access request 1 (access type: READ, target memory: 1, number of remaining read/write commands: 1). At the time point T1, the read/write control circuit 102 can select either the memory access request 0 or the memory access request 1, but in this operation example, it is assumed that the read command is issued in response to the memory access request 0 received earlier. And thus, the timer 1056 for the memory 1 sets the period after issuance of the read command to a certain memory, during which the read command cannot be issued to a different memory, and starts decrementing.

At a time point T3, the access holding circuit 101 holds the memory access request 0 (access type: READ, target memory: 0, number of remaining read/write commands: 1) and the memory access request 1 (access type: READ, target memory: 1, number of remaining read/write commands: 1). At the time point T3, since the value of the timer 1056 for the memory 1 is 5 and the value is not 0, the memory access request 1 is masked, and the read/write control circuit 102 selects the memory access request 0.

At time points T4 and T5, the access holding circuit 101 holds only the memory access request 1 (access type: READ, target memory: 1, number of remaining read/write commands: 1). However, since the values of the timer 1056 are 6 (T4) and 5 (T5) and the values are not 0, the memory access request 1 is masked, and accordingly, the read/write control circuit 102 does not select any memory access request.

At a time point T6, the access holding circuit 101 holds the memory access request 1 (access type: READ, target memory: 1, number of remaining read/write commands: 1) and a memory access request 2 (access type: READ, target memory: 0, number of remaining read/write commands: 2). That is, at the time point T6, the memory access request 2 to the memory 0 is stored in the access holding circuit 101. Since the value of the timer 1056 is 4 (T6) and the value is not 0, the memory access request 1 is masked, and the read/write control circuit 102 selects the memory access request 2. Then, at a time point T15, at which a predetermined period (6 cycles) during which the read command cannot be issued to a different memory has elapsed, the value of the timer 1056 becomes 0, the mask for the memory access request 1 is released, and the read/write control circuit 102 selects the memory access request 1.

Next, FIGS. 5A and 5B are a diagram illustrating an operation example 2 of the memory access request selection in the present embodiment. This operation example is different from the operation example 1 in that the memory access request 2 to the memory 0 is not stored in the access holding circuit 101 at the time point T6.

At the time point T1, the read/write control circuit 102 can select either the memory access request 0 or the memory access request 1, but in this operation example, it is assumed that the read command is issued in response to the memory access request 0 received earlier. And thus, the timer 1056 for the memory 1 sets the period after issuance of the read command to a certain memory, during which the read command cannot be issued to a different memory, and starts decrementing.

At the time point T3, since the value of the timer 1056 is 5 and the value is not 0, the memory access request 1 is masked, and the read/write control circuit 102 selects the memory access request 0. From time points T4 to T9, only the memory access request 1 is held in the access holding circuit 101. However, since the timer 1056 is not 0, the memory access request 1 is masked, and the read/write control circuit 102 does not select any memory access request. Then, at a time point T10, at which the predetermined period (6 cycles), from T4 to T9, during which the read command cannot be issued to a different memory has elapsed, the value of the timer 1056 becomes 0, the mask for the memory access request 1 is released, and the read/write control circuit 102 selects the memory access request 1.

Note that, although an embodiment has been described using the read command as an example in FIGS. 4A to 4C and FIGS. 5A and 5B, the same applies to the write command. For example, in the above description, an example has been described in which the timer sets the period after issuance of the read command, during which the read command cannot be issued to a different memory, and starts decrementing. Similarly, the timer may set a period after issuance of the write command, during which the write command cannot be issued to a different memory, and may start decrementing.

As described above, even when there is no more memory access request to a memory to which the read/write command has been issued immediately preceding, the memory access request, which requires waiting for command issuance due to the memory switching, is configured not to be selected. Accordingly, it is possible to suppress a decrease in memory utilization efficiency.

According to the present invention, it is possible to suppress the decrease in the memory utilization efficiency.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-075815, filed May 1, 2023, which is hereby incorporated by reference herein in its entirety.

What is claimed is:

1. A memory controller that issues a command to access a plurality of memory devices including a first memory device and a second memory device which is different from the first memory device, wherein the first memory device comprises a plurality of first banks and the second memory device comprises a plurality of second banks which are different from the plurality of first banks, the memory controller comprising: a holding circuit configured to hold a read and/or write access request which comprises a target memory device and a target bank; and a control circuit configured to select an access request from the access requests held in the holding circuit and to issue a read command and/or a write command based on the selected access request, wherein the control circuit controls, in a case where a first access request to the first memory device is selected and then a first read command and/or write command is issued, to prohibit to select a second access request to the second memory for a predetermined period after elapse of a tCCD period (Column to Column Delay period) of the first read command and/or write command, wherein the predetermined period after elapse of a tCCD period is greater than the tCCD period, and the control circuit controls, in a case where the first access request to the first memory device is selected and then the first read command and/or write command is issued, to permit to select a third access request to the first memory for the predetermined period.

2. The memory controller according to claim 1, wherein, in a case where a read command is issued immediately preceding, the period is a period during which a read command cannot be issued to the second memory device.

3. The memory controller according to claim 1, wherein, in a case where a write command is issued immediately preceding, the period is a period during which a write command cannot be issued to the second memory device.

4. The memory controller according to claim 1, wherein the control circuit selects the access request based on a priority access type indicating which of the read command and the write command is to be preferentially issued.

5. The memory controller according to claim 1, further comprising a first determination circuit configured to determine whether or not, for each of the memory access requests stored in the holding circuit, a target page is open in a target bank of a target memory, and to output the memory access request that is for the target page being open.

6. The memory controller according to claim 5, further comprising a second determination circuit configured to output, among the memory access requests output by the first determination circuit, a memory access request corresponding to a priority access type indicating whether it is a period for preferentially issuing the read command or a period for preferentially issuing the write command.

7. The memory controller according to claim 6, further comprising a third determination circuit configured to output, among the memory access requests output by the second determination circuit, a memory access request for which waiting for command issuance due to memory switching does not occur.

8. The memory controller according to claim 7, further comprising a request selection circuit configured to select a memory access request from the memory access requests output by the third determination circuit, and to generate and output the read command or the write command of the memory access request being selected.

9. The memory controller according to claim 1, wherein the control circuit is configured to be able to select, after elapse of the period, an access request to the second memory device.

10. The memory controller according to claim 1, further comprising a timer configured to set a period after issuance of the read command, during which the read command cannot be issued to a different memory, and to start decrementing.

11. The memory controller according to claim 1, further comprising a timer configured to set a period after issuance of the write command, during which the write command cannot be issued to a different memory, and to start decrementing.

12. The memory controller according to claim 1, further comprising:

a timer configured to start decrementing from issuance of the first read command and/or write command; and wherein the control circuit controls not to select, if the timer indicates one or more, the second access request to the second memory device, and the control circuit controls to be able to select, after the timer indicates zero, the second access request to the second memory device, and to issue the second read command and/or write command in a case where the second access request is selected.

13. A control method for a memory controller that issues a command to access a plurality of memory devices including a first memory device and a second memory device which is different from the first memory device, wherein the first memory device comprises a plurality of first banks and the second memory device comprises a plurality of second banks which are different from the plurality of first banks, the memory controller including a holding circuit configured to hold a read and/or write access request which comprises a target memory device and a target bank, and a control circuit configured to select an access request from the access requests held in the holding circuit and to issue a read command and/or a write command based on the selected access request, and the control method comprising: controlling, in a case where a first access request to the first memory device is selected and then a first read command and/or write command is issued, to prohibit to select a second access request to the second memory for a predetermined period after elapse of a tCCD period (Column to Column Delay period) of the first read command and/or write command, wherein the predetermined period after elapse of a tCCD period is greater than the tCCD period, and controlling, in a case where the first access request to the first memory device is selected and then the first read command and/or write command is issued, to permit to select a third access request to the first memory for the predetermined period.

14. A non-transitory computer-readable storage medium storing a program to cause a computer to execute a control method for a memory controller that issues a command to access a plurality of memory devices including a first memory device and a second memory device which is different from the first memory device, wherein the first memory device comprises a plurality of first banks and the second memory device comprises a plurality of second banks which are different from the plurality of first banks, the memory controller including a holding circuit configured to hold a read and/or write access request which comprises a target memory device and a target bank, and a control circuit configured to select an access request from the access requests held in the holding circuit and to issue a read command and/or a write command, and the control method comprising: controlling, in a case where a first access request to the first memory device is selected and then a first read command and/or write command is issued, to prohibit to select a second access request to the second memory for a predetermined period after elapse of a tCCD period (Column to Column Delay period) of the first read command and/or write command, wherein the predetermined period after elapse of a tCCD period is greater than the tCCD period, and controlling, in a case where the first access request to the first memory device is selected and then the first read command and/or write command is issued, to permit to select a third access request to the first memory for the predetermined period.

* * * * *